Dec. 2, 1952  J. A. BRADY, SR  2,620,201
PUBLIC UTILITY SERVICE TRAILER
Filed March 30, 1950  3 Sheets-Sheet 1
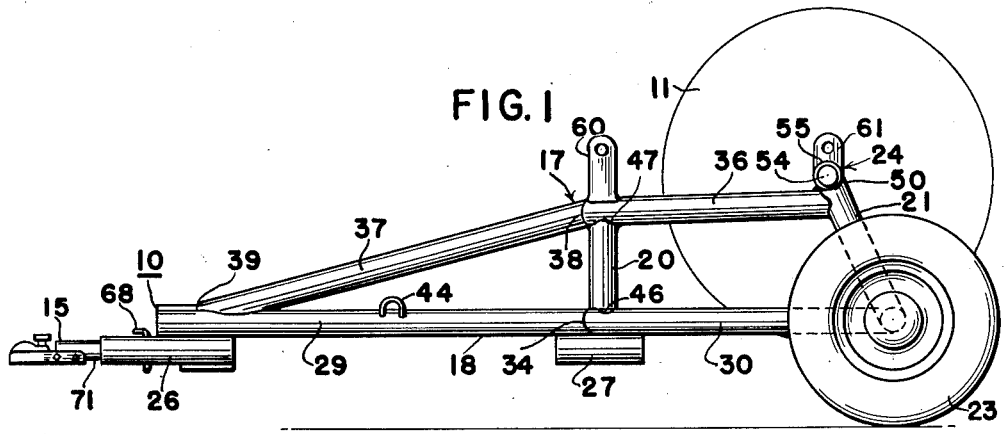
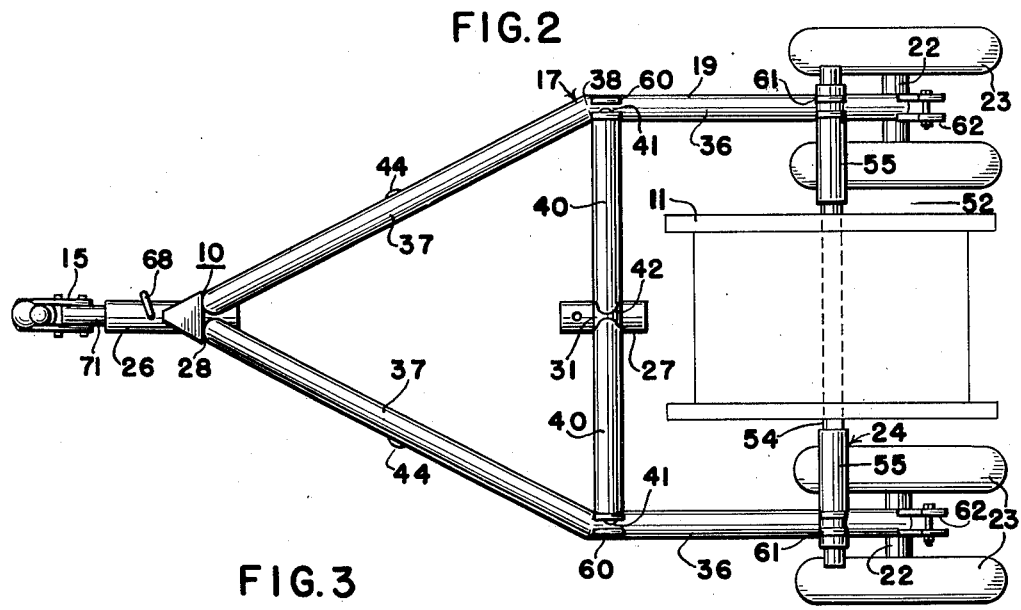
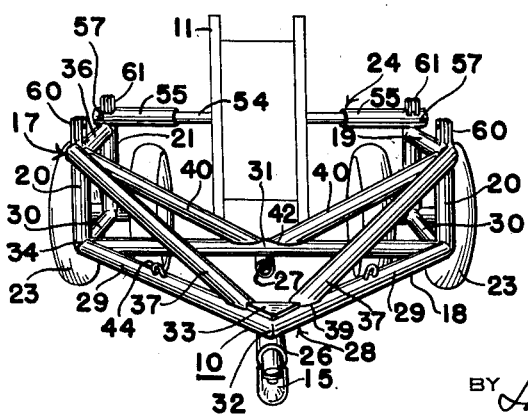
INVENTOR.
John A. Brady, Sr.
BY
ATTORNEYS.

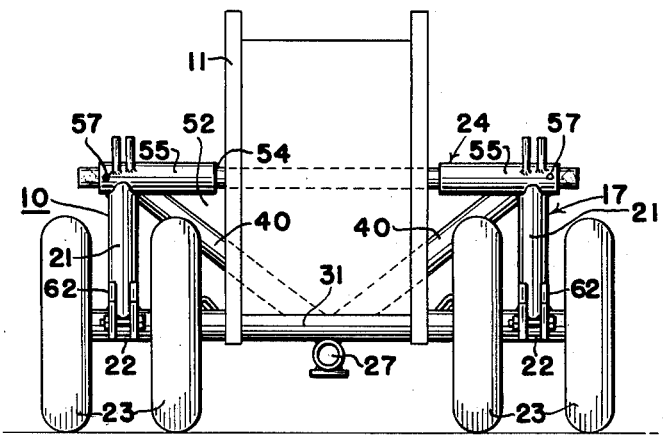
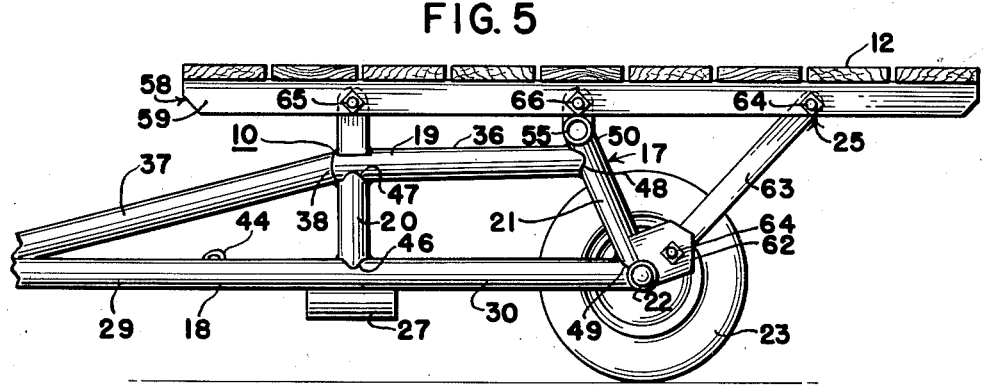
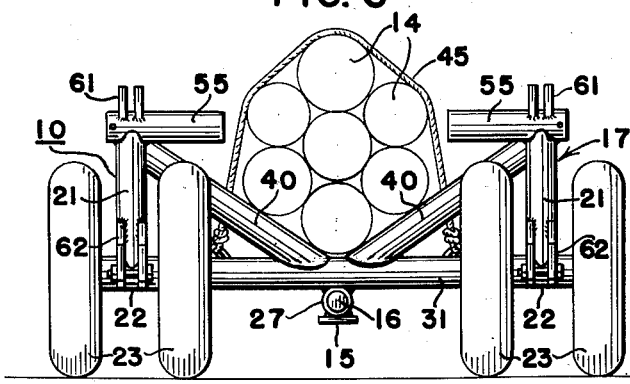

Dec. 2, 1952 J. A. BRADY, SR 2,620,201
PUBLIC UTILITY SERVICE TRAILER
Filed March 30, 1950 3 Sheets-Sheet 3
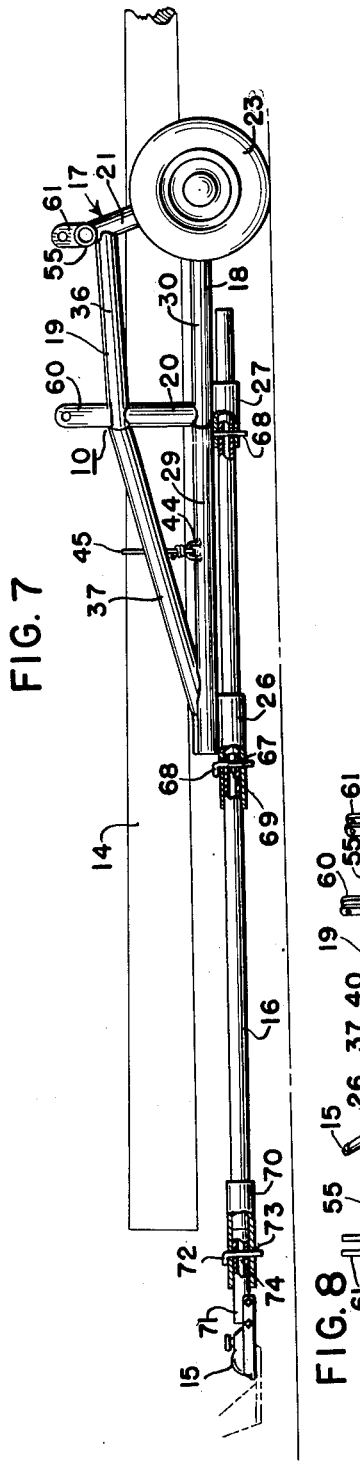
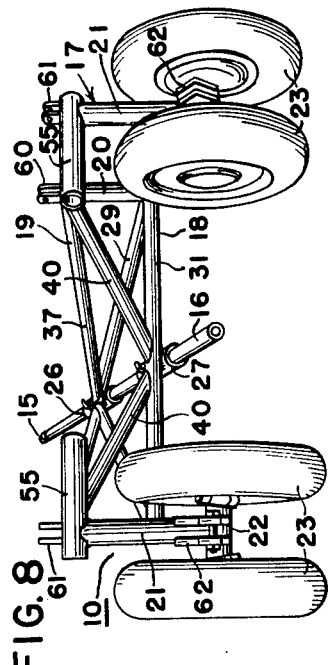
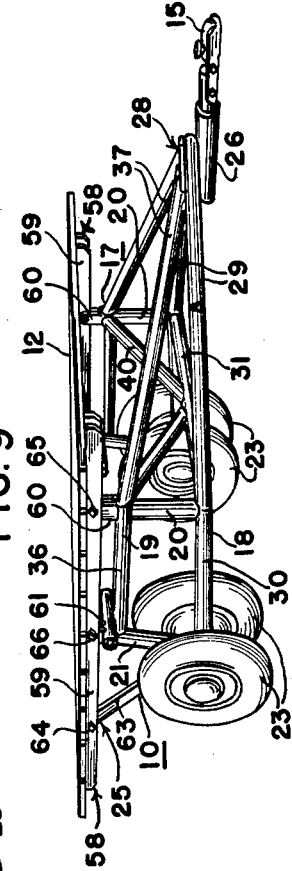
INVENTOR.
John A. Brady, Sr.
BY *Lamarte, Allwin & Rommel*
ATTORNEYS.

Patented Dec. 2, 1952

2,620,201

UNITED STATES PATENT OFFICE 2,620,201

PUBLIC UTILITY SERVICE TRAILER

John A. Brady, Sr., Golden Meadow, La.

Application March 30, 1950, Serial No. 152,875

3 Claims. (Cl. 280—63)

This invention relates to public utility service trailers and more particularly to those for use by telephone, telegraph and electric power and light companies in the transportation of cable, poles, and for in the stringing of wires.

It is usual for such companies to have three different types of trailers—one type particularly well adapted for carrying heavy cable reels, another type for transporting poles, and a third type embodying a flat bed particularly useful in supporting wire reels for stringing wires.

The principal object of my invention is to provide a trailer that is capable of fulfilling all these requirements, thus making possible a reduction in investment outlay by such companies as well as reducing the housing requirements for equipment of this kind.

Another object is to provide a trailer having four ground wheels rotatable about the same axis and arranged in pairs to each side of a space sufficiently large to receive a cable reel therebetween, the frame of the trailer and the support means for the reel being so constructed and arranged that several men and auxiliary hoisting mechanism or jacks are not required to place the cable reel in supporting relation to the ground wheels for transportation. The four ground wheels also permit the trailer to be maneuvered on soft ground even though the trailer is supporting several poles.

A further object is to provide trailers which may be built economically on a production basis, the frames being mainly of tubular members welded together, some of which are diagonally disposed to form cradle-like structures for receiving poles and in a manner least likely to cut or bruise the poles during placing, transportation and removal of the poles with respect to the trailers. The cradle-like structures permit drawing off cable from the lower portion of a reel, revolubly mounted on the rear portion of the trailer, in a forward direction, without first threading the cable beneath trailer frame members, the cradle-like structures serving as guides upon which the cable thus drawn off may ride.

Other objects and advantages of the invention will appear in the following detailed description of a highly satisfactory embodiment of my invention, taken in connection with the accompanying drawings, forming a part of this specification, and in which drawings:

Fig. 1 is a side elevational view of the trailer supporting a cable reel.

Fig. 2 is a plan view of the same.

Fig. 3 is a perspective view of the trailer looking toward the front thereof with the cable reel in position for transportation.

Fig. 4 is a rear elevational view of the assembly in Figs. 1–3.

Fig. 5 is a fragmentary side elevational view of the trailer showing a platform supported thereby, one of the wheels of the tractor being removed to disclose preferred details.

Fig. 6 is a rear end elevational view of the trailer supporting a plurality of poles.

Fig. 7 is a view partly in side elevation and partly in vertical section, showing the tractor equipped with a ridge pole or reach and supporting a single pole.

Fig. 8 is a perspective view of the trailer looking toward the rear end thereof and equipped with the ridge pole or reach, but with the pole removed.

Fig. 9 is a perspective view of the trailer looking toward the front and right side thereof, and illustrated as supporting a platform as shown in Fig. 5.

In the drawings I show a trailer 10 variously supporting a cable reel 11 in Figs. 1–4, a platform 12 in Figs. 5 and 9, and a pole or poles 14 in Figs. 6 and 7. In Figs. 1–4 and 9 the trailer is shown directly equipped with a conventional short tractor trailer coupling member 15 and in Figs. 6–8 with a ridge pole or reach 16 carrying at its forward end a conventional short tractor trailer coupling member.

The tractor preferably comprises a frame 17 including a lower main horizontal skeleton 18, an upper skeleton 19 and upright braces 20 and 21 between portions of the two skeletons; a pair of spaced apart, axially aligned dead axles 22 at the rear end portion of the frame 17; a pair of ground wheels 23 on each of the axles; means 24 for supporting the cable reel 11 upon the frame 17; means 25 for supporting the platform 12 upon the frame 17; and a pair of axially aligned tubular members 26 and 27 carried by and beneath the frame 17 for detachably connecting the ridge pole or reach 16 to the frame.

Referring first to the lower skeleton 18, it preferably comprises a substantially V-shaped forward section having a foremost apex portion 28 and rearwardly extending diverging arms 29, first longitudinal rails 30 extending in spaced apart, parallel relation, rearwardly from and connected to the arms 29, and a cross member 31 rigidly connected to the rails 30 adjacent to the junctures thereof with the arms 29. These members of the lower skeleton may be made of tubular metal the apex portion 28 preferably comprising the forward ends of the arms 29, welded together as at 32 and a triangular gusset plate 33 welded upon the meeting end portions of the arms. It is to be understood, however, that this apex portion 28 may be made in any suitable manner, such as by a casting with which the arms 29 as well as the forward tubular member 26, may have connection. The arms 29 may be secured to the rails 30 by welding as at 34, or the arms and rails may be formed from a continuous piece of bent tubing.

As to the upper skeleton 19, it preferably comprises second longitudinal rails 36 substantially paralleling one another and disposed in spaced relation to and above the first rails 30, first diagonal bolster arms 37 connected to the forward end portions of rails 36 as by welding at 38 and to the apex portion 28, as by welding at 39, and second diagonal transverse bolster arms 40 connected to the forward end portions of rails 36, as by welding at 41 and to the intermediate portion of cross member 31, as by welding at 42. The cross member 31 and the bolster arms 40 constitute in the example shown a transverse cradle-like bolster construction and cooperate with the first bolster arms 37 to support a pole or poles as shown in Figs. 6 and 7. The arms 29 may be provided with suitable eye members 44 to which the ends of a rope, chain or cable 45, trained about the pole or poles, may be secured, to lash the load down upon the bolster arms.

While any suitable braces may be provided between the companion rails 30 and 36, I have shown forward upright braces 20 welded as at 46 and 47 to these rails, 30 and 36, respectively, and I preferably secure the braces 21 to the rear ends of rails 36 by butt welding at 48 and to the rear ends of rails 30 by welding 49, at the juncture of the brace 21, rail 30 and dead axle 22. I also prefer to incline the rear braces 21 upwardly and forwardly from their respective dead axles, so as to utilize the upper ends 50 of these braces for support of a part of the means 24 for supporting the cable reel 11 upon the frame 17 as hereinafter described.

The dead axles 22 have not been detailed because any suitable arrangement may be provided with suitable ball or roller bearings, not shown in the drawing, whereby the wheels 23 may rotate independently of one another, and at different circumferential speeds as when rounding corners. It will be noted, however, that the pair of dead axles 22 are axially aligned and secured one to each of the upright braces 21 and to the rear end of the companion rail 30 so as to extend to each side of its respective upright brace, with the wheels 23 of the associated pair disposed at opposite sides of the upright brace, whereby a space 52 is provided between the pairs of wheels for the accommodation of the cable reel 11.

I have found by this construction and arrangement of parts that, although it is desirable to equip trailers for hauling poles or heavy loads with tires having wide treads so as to be able to maneuver the trailer on soft ground, I can use wheels with smaller tires than is conventional with cable reel trailers, because of the use of four wheels, thus reducing cost of tire replacement and with other advantages, without detracting from ability to conveniently maneuver the trailer on soft ground.

The means 24 for supporting the cable reel on the frame, preferably comprises a carrying bar 54 adapted to extend through and to each side of the usual hole at the center of the cable reel, a pair of axially aligned bearings 55 for the end portions of the bar 54, and pins 57, or the like, which may pass through the bearings 55 and the bar 54 as indicated in Fig. 4. The bearings 55 may be ordinary short lengths of tubes and, in the example shown also support parts of means 25 to secure the platform 12 to the trailer, when such is desired. It will be noted that the means 24 is well forwardly of the axis of wheels 23. This is important since I have found it desirable to carry the cable reel while in such location to guard against undesirable forces transmitted to the tractor trailer hitch which would occur if the means were directly above or to the rear of such axis of the wheels. It is also desirable to carry the cable reel forward of the center of the wheels to avoid tipping over of the trailer rearwardly when paying out cable from the reel on the trailer and when the trailer is not attached to the towing vehicle and at which time the apex portion of the frame may rest on the ground.

Loading of the cable reels on the trailer is accomplished by tilting the front upward until the bearings 55 are on a level with the hole through the center of the cable reel, whereupon the carrying bar is inserted through the bearings and the center of the cable reel. Then, using the frame of the trailer as a lever, the reel is lifted from the ground and is on the trailer in carrying position and its weight is equally distributed among the four wheels. To unload, the reverse procedure may be followed, using the tractor frame as a lever to lower the cable reel upon the ground.

With reference to means 25, in the example shown, it comprises parallel rails 58 secured to the underside of the platform, each rail including one or more downwardly extending flanges 59, a plurality of pairs of upstanding lugs 60 carried by the frame 17, a plurality of pairs of upstanding lugs 61 carried by the bearings 55, a plurality of pairs of rearwardly extending lugs 62 secured to, as by welding, the braces 21 and axles 22, and diagonal braces 63 detachably secured to the lugs 62 and to the flanges 59, as by bolts 64. The rails 58 may be secured to the lugs 60 and 61, by bolts 65 and 66, respectively.

While reference is made to a platform as a unit supported by means 25, such being useful upon which to mount any of numerous types of wire stringing reels, not shown in the drawings, it is of course to be understood that this platform may be the bottom of any suitable stake or box body not shown in the drawings.

The tubular members 26 and 27, in the example shown are each provided with radially aligned holes 67 for the reception of pins 68 which also pass through radially aligned holes 69 in the ridge pole or reach 16, as shown in Fig. 7. The members 26 and 27 may be secured, as by welding to the underside of the apex portion 28 of lower skeleton frame 18, and to the underside of the cross member 31, respectively, these members 26 and 27 being axially aligned. The ridge pole or reach 26 may be made of pipe or tubular stock, and at its forward end is provided with a sleeve 70 into which a short pipe or tube 71 telescopes, the latter being secured to the tractor trailer coupling member 15. A pin 72 extending through radially disposed holes 73 and 74 in the sleeve 70 and pipe or tube 71, as shown in Fig. 7. When the ridge pole or reach is removed from the tubular members 26 and 27, and the tractor trailer coupling member 15 is removed from sleeve 70, the member 15 may be applied directly to the trailer by telescoping the short pipe or tube 71 into tubular member 26 and there secured by one of the pins 68, as indicated in Figs. 1 and 2.

It will be noted from an inspection of Fig. 3 that a cable, not shown in the drawing, may be drawn from the lower portion of the reel 11 in a forward direction without first threading the cable beneath any portion of the trailer frame and that the diagonal arms 37 and 40 will act as guides upon which the cable thus drawn off may ride, either due to the weight of the cable or the direction in which it is being pulled. At times it is desirable to thus pull the cable from the reel, with the coupling member 15 resting upon the ground. In such position the tongue-like forward portion of the trailer resists swinging movement of the frame 17 about the axis of axles 22.

It is believed that the advantages of a trailer constructed according to the present invention will be fully understood from the foregoing description. It is pointed out that it fulfills the many requirements of public utility companies heretofore accomplished by the use of three different trailers, and that, because of the manner in which the wheels are assembled in the frame and the distribution of the weight of the heavy cable reels on the two dead axles, the frame may be built sufficiently light that it can be operated with minimum effort.

I claim:

1. In a utility trailer, the combination of a frame including lower and upper skeletons, each comprising parallel rear longitudinal rails and forward converging arms connected to the forward ends of said rails and to each other at the forward portion of the trailer, the arms and rails of the lower skeleton disposed in substantially the same plane and the arms of said upper skeleton inclining downwardly and forwardly from their respective rails, a transverse cradle-like bolster construction extending between and fixedly secured to the rails of said skeletons, adjacent to the forward end portions of the rails and disposed below the plane of the tops of the rails of said upper skeleton, ground wheels supporting said skeletons at the rearward portions of their rails, and means carried by the frame, above said upper skeleton and forwardly of the axis of said wheels for removably supporting a cable reel whereby cable may be drawn from the lower portion of the reel in a direction either forwardly or rearwardly of the trailer and when drawn forwardly will be disposed above said cradle-like bolster.

2. In a utility trailer, the combination of a frame including lower and upper skeletons, each comprising parallel rear longitudinal rails and forward converging arms connected to the forward ends of said rails and to each other at the forward portion of the trailer, the arms of said upper skeleton inclining downwardly and forwardly from their respective rails, a transverse cradle-like bolster construction extending between and fixedly secured to the rails of said skeletons, adjacent to the forward end portions of the rails, a pair of uprights extending one from the rear end portion of the rail of the lower skeleton, diagonally and forwardly to the rear end portion of the companion rail of the upper skeleton, a pair of dead axles, axially aligned and secured one to each of said uprights at the lower portion thereof, said axles extending to each side of its respective upright, a pair of ground wheels independently rotatable on each of said axles, the wheels of each pair being disposed on opposite sides of their respective uprights, whereby a space is provided between the pairs of wheels for the accommodation of a cable reel and, means carried by the upper end portions of said diagonally and forwardly extending uprights, for rotatably supporting a cable reel.

3. In a utility trailer, the combination of a frame including a lower main horizontal skeleton comprising a substantially V-shaped forward section having a foremost apex portion and rearwardly extending diverging arms, first longitudinal rails extending in parallel relation and rigidly connected to the rearward portion of said arms, and a cross member rigidly connected to said rails adjacent to the junctures thereof with said arms, an upper skeleton comprising second longitudinal rails substantially paralleling one another and disposed in spaced relation to and above said first rails, first diagonal bolster arms rigidly connected to the forward end portions of said second rails and to the apex portion of said V-shaped forward section and second diagonal transverse bolster arms rigidly connected to the forward end portions of said second rails and to the intermediate portion of said cross member, and upright braces secured to said first and second rails; a pair of dead axles, axially aligned and secured one to each of said first rails at the rear portion thereof, said axles extending to each side of its respective rail; a pair of ground wheels independently rotatable on each of said axles, the wheels of each pair being disposed on opposite sides of their respective first rail, whereby a space is provided between the pairs of wheels for the accommodation of a cable reel; and means for supporting a cable reel rotatable on an axis transversally of the frame, above said upper skeleton and forwardly of the axis of said dead axles.

JOHN A. BRADY, Sr.

REFERENCES CITED

The following references are of record in the file of this patent:

UNITED STATES PATENTS

| Number | Name | Date |
| --- | --- | --- |
| 1,864,676 | Smith et al. | June 28, 1932 |
| 2,210,969 | Blount | Aug. 13, 1940 |
| 2,264,571 | Jeffrey | Dec. 2, 1941 |
| 2,430,786 | Schlabach et al. | Nov. 11, 1947 |
| 2,536,563 | Montgomery | June 2, 1951 |

FOREIGN PATENTS

| Number | Country | Date |
| --- | --- | --- |
| 461,936 | Germany | June 30, 1928 |
| 662,441 | Germany | July 13, 1938 |